United States Patent
Zhang

(10) Patent No.: US 11,586,535 B2
(45) Date of Patent: Feb. 21, 2023

(54) METHOD AND APPARATUS FOR DESIGNING DUAL-MIRROR SHARED CONF PARTITION FILE

(71) Applicant: ZHENGZHOU YUNHAI INFORMATION TECHNOLOGY CO., LTD., Henan (CN)

(72) Inventor: Zhaoyi Zhang, Henan (CN)

(73) Assignee: ZHENGZHOU YUNHAI INFORMATION TECHNOLOGY CO., LTD., Henan (CN)

( * ) Notice: Subject to any disclaimer, the term of this patent is extended or adjusted under 35 U.S.C. 154(b) by 771 days.

(21) Appl. No.: 16/475,104

(22) PCT Filed: Aug. 31, 2018

(86) PCT No.: PCT/CN2018/103433
§ 371 (c)(1),
(2) Date: Jun. 30, 2019

(87) PCT Pub. No.: WO2019/165774
PCT Pub. Date: Sep. 6, 2019

(65) Prior Publication Data
US 2021/0365361 A1 Nov. 25, 2021

(30) Foreign Application Priority Data
Feb. 28, 2018 (CN) .......................... 201810166454.4

(51) Int. Cl.
*G06F 16/20* (2019.01)
*G06F 12/02* (2006.01)
*G06F 16/27* (2019.01)

(52) U.S. Cl.
CPC ........ *G06F 12/0246* (2013.01); *G06F 16/278* (2019.01); *G06F 2212/2022* (2013.01)

(58) Field of Classification Search
None
See application file for complete search history.

(56) References Cited

U.S. PATENT DOCUMENTS 8,707,018 B1 * 4/2014 Hooker ................. G06F 9/4411
713/1
9,262,194 B2 * 2/2016 Sudhakar ............ G06F 9/45558
(Continued)

FOREIGN PATENT DOCUMENTS

CN 102521016 A 6/2012
CN 103491144 A 1/2014
(Continued)

OTHER PUBLICATIONS

First Office Action dated Aug. 31, 2020 for Chinese patent application No. 201810166454.4, English translation provided by Global Dossier.
(Continued)

*Primary Examiner* — Jau Shya Meng
(74) *Attorney, Agent, or Firm* — Yue (Robert) Xu; Apex Attorneys at Law, LLP

(57) ABSTRACT

A method, an apparatus, a device and a computer readable storage medium for designing a dual-mirror shared conf partition file are provided. The method includes pre-configuring disk space occupation capacities for a first flash mirror file, a second flash mirror file, and a shared conf partition of the BMC, and generating a FW file of the BMC which does not include a shared conf partition file. The method further includes mounting partitions configured in one of the first and second flash mirror files firstly and then mounting the shared Conf partition at last, in response to an instruction for starting the one of the first and second flash mirror files. The shared conf partition stores a configuration file of the BMC. The shared conf partition and the configuration file are (Continued)

automatically generated when the BMC runs normally for the first time.

15 Claims, 3 Drawing Sheets

(56) References Cited

U.S. PATENT DOCUMENTS

| | | | |
|---|---|---|---|
| 9,846,706 B1* | 12/2017 | Basov | G06F 16/17 |
| 10,152,387 B1* | 12/2018 | Chakraborty | G06F 11/1469 |
| 2004/0267836 A1* | 12/2004 | Armangau | G06F 11/1435 |
| | | | 707/999.203 |
| 2009/0070761 A1 | 3/2009 | Zhao | |
| 2009/0172253 A1* | 7/2009 | Rothman | G06F 12/0246 |
| | | | 711/E12.008 |
| 2012/0017114 A1* | 1/2012 | Timashev | G06F 11/1451 |
| | | | 714/15 |
| 2014/0282500 A1* | 9/2014 | Parthiban | G06F 11/30 |
| | | | 718/1 |
| 2015/0039873 A1 | 2/2015 | Lesartre et al. | |
| 2015/0067084 A1 | 3/2015 | Yeh et al. | |
| 2017/0060975 A1* | 3/2017 | Akyureklier | G06F 11/2097 |
| 2018/0048712 A1* | 2/2018 | Sarisky | G06F 3/0619 |

FOREIGN PATENT DOCUMENTS

| | | |
|---|---|---|
| CN | 103870312 A | 6/2014 |
| CN | 104272296 A | 1/2015 |
| CN | 104424054 A | 3/2015 |
| CN | 104615506 A | 5/2015 |
| CN | 105955842 A | 9/2016 |
| CN | 108345477 A | 7/2018 |
| CN | 111274192 A | 6/2020 |

OTHER PUBLICATIONS

Anonymous, "RH2288H V3 firmware upgrade BMC primary and backup partition mirroring", "Huawei Enterprise Interactive Community", Link: https://forum.huawei.com/enterprise/zh/forum.php?mod=viewthread&tid=381541, Dec. 22, 2016.
International Search Report dated Sep. 6, 2019 for for International Application PCT/CN2018/103433.
Written Opinion of the International Search Authority dated Sep. 6, 2019 for for International Application PCT/CN2018/103433.

* cited by examiner

METHOD AND APPARATUS FOR DESIGNING DUAL-MIRROR SHARED CONF PARTITION FILE

The present application is a national phase application of PCT international patent application PCT/CN2018/103433, filed on Aug. 31, 2018 which claims priority to Chinese Patent Application No. 201810166454.4, titled "method and apparatus for designing dual-mirror shared conf partition filE", filed on Feb. 28, 2018 with the China National Intellectual Property Administration, both of which are incorporated herein by reference in their entireties.

FIELD

The present disclosure relates to the technical field of a computer baseboard management controller, and in particular, to a method, an apparatus, a device and a computer readable storage medium for designing a dual-mirror shared conf partition file.

BACKGROUND

The BMC (baseboard management controller) is a controller that provides intelligent management under the IPMI (Intelligent Platform Management Interface) structure. The BMC has its own power supply and can automatically obtain information of temperature, voltage, fan, power consumption, the power supply, a memory state of CPU and others, to monitor an operation state of a system. Moreover, the BMC supports interfaces of IPMI, Restful, Redfish, SNMP, SMTP and others, and supports Web UI access and IPMI command access.

With a rapid development of server technology, in order to ensure the stability and reliability of the BMC, many server systems support a BMC dual-mirror system, where a 64M flash memory is divided into two 32M BMC mirror partition files, namely a first mirror Image1 and a second mirror Image2. When starting Image1 by default, partition files corresponding to Image1 are mounted. Image2 is used as a backup, and is automatically selected to be started by the BMC restarted when the file of the Image1 is damaged, avoiding refreshing of Image1.

However, partition files of Image1 and Image2 are independent to each other, especially a conf partition for storing a configuration file of the BMC, so that it cannot be guaranteed that files in Image1 and Image2 for starting the conf partition are consistent, and thus a further configuration is required. Furthermore, when saving a configuration to refresh one of Image1 and Image2, the configuration files in Image1 and Image2 cannot be the same after the refreshing, causing a lot of unnecessary troubles.

Therefore, it is desired in the art to design a more reasonable and effective dual-mirror shared conf partition file for a BMC dual-mirror system.

SUMMARY

It is an object of the present disclosure to provide a method, an apparatus, a device and a computer readable storage medium for designing a dual-mirror shared conf partition file, to share a conf partition file by two mirror systems of BMC, thereby avoiding repeated configuration, which is beneficial to saving manpower and improving work efficiency, and is highly practical.

In order to solve the above technical problem, a technical solution is provided according to embodiments of the present disclosure as follows.

According to an aspect of the present disclosure, a method for designing a dual-mirror shared conf partition file is provided, which is applied to a dual-mirror system of a baseboard management controller.

The method includes pre-configuring disk space occupation capacities for a first flash mirror file, a second flash mirror file, and a shared conf partition of the baseboard management controller respectively according to values of the disk space occupation capacities inputted by a user, and generating a FW file of the baseboard management controller, where a file in the shared conf partition is not in the FW file.

The method further includes mounting partitions of one of the first flash mirror file and the second flash mirror file firstly and then mounting the shared Conf partition at last, in response to an instruction for starting the one of the first flash mirror file and the second flash mirror file.

The shared conf partition is automatically generated when the baseboard management controller runs normally for a first time. The shared conf partition stores a configuration file of the baseboard management controller. The configuration file is automatically generated when the baseboard management controller runs normally for the first time. The shared conf partition is located in a flash memory of the baseboard management controller.

Optionally, the method further includes storing, when it is detected that the configuration file is modified, the modified configuration file in the shared conf partition, to be shared by the first flash mirror file and the second flash mirror file.

Optionally, the method further includes erasing the shared conf partition and erasing a mirror partition corresponding to updated one of the first flash mirror file and the second flash mirror file, when it is detected that the flash memory of the baseboard management controller is updated.

Optionally, the shared conf partition is located at a back-end of the flash memory of the baseboard management controller.

Optionally, the mounting partitions of one of the first flash mirror file and the second first flash mirror file firstly includes: mounting a root partition, a boot partition, a www partition, and an osimage partition of the one of the first flash mirror file and the second first flash mirror file firstly.

According to another aspect of the present disclosure, an apparatus for designing a dual-mirror shared conf partition file is provided.

The apparatus includes a pre-processing module, configured to pre-configure disk space occupation capacities for a first flash mirror file, a second flash mirror file, and a shared conf partition of a baseboard management controller respectively according to values of the disk space occupation capacities inputted by a user, and generate a FW file of the baseboard management controller. A file in the shared conf partition is not in the FW file. The shared conf partition is automatically generated when the baseboard management controller runs normally for a first time. The shared conf partition stores a configuration file of the baseboard management controller. The configuration file is automatically generated when the baseboard management controller runs normally for the first time. The shared conf partition is located in a flash memory of the baseboard management controller.

The apparatus further includes a mirror file startup module, configured to mount partitions of one of the first flash mirror file and the second flash mirror file firstly and then mount the shared Conf partition at last, in response to an instruction for starting the one of the first flash mirror file and the second flash mirror file.

Optionally, the apparatus further includes a modifying module, configured to store, when it is detected that the configuration file is modified, the modified configuration file in the shared conf partition, to be shared by the first flash mirror file and the second flash mirror file.

Optionally, the apparatus further includes an erasing module, configured to erase the shared conf partition and erase a mirror partition corresponding to updated one of the first flash mirror file and the second flash mirror file, when it is detected that the flash memory of the baseboard management controller is updated.

A device for designing a dual-mirror shared conf partition file is further provided in an embodiment of the present disclosure, including: a processor configured to execute a computer program stored in a memory to implement steps of anyone of the methods for designing a dual-mirror shared conf partition file as described above.

A computer readable storage medium is further provided in an embodiment of the present disclosure, where the computer readable storage medium stores a program for designing a dual-mirror shared conf partition file, and the program for designing the dual-mirror shared CONF partition file is used to be executed by a processor to implement steps of anyone of the methods for designing a dual-mirror shared conf partition file as described above.

In the method for designing a dual-mirror shared conf partition file according to an embodiment of the present disclosure, disk space occupation capacities are pre-configured for a first flash mirror file, a second flash mirror file, and a shared conf partition of a baseboard management controller respectively according to values of the disk space occupation capacities inputted by a user. A FW file of the baseboard management controller is generated, where the shared conf partition file is not in the FW file. Partitions of one of the first flash mirror file and the second flash mirror file are firstly mounted and then the shared Conf partition is mounted at last, in response to an instruction for starting the one of the first flash mirror file and the second flash mirror file. The shared conf partition is automatically generated when the baseboard management controller runs normally for a first time, and stores a configuration file of the baseboard management controller. The configuration file is automatically generated when the baseboard management controller runs normally for the first time. The shared conf partition is located in a flash memory of the baseboard management controller.

The technical solution provided by the present disclosure has an advantage that, with the BMC dual-mirror system shared conf partition, two mirror systems use the conf partition of the shared area. Regardless of which mirror system is used, the shared conf partition in a flash is mounted at last. The configuration information of the BMC is stored in the shared conf partition to avoid repeated configuration. In this way, the two mirror systems can use the same configuration information, so as to ensure that files of the conf partition started by the two mirror systems are consistent without requiring a further configuration. Therefore, a more reasonable and effective dual-mirror shared conf partition file is designed for the BMC dual-mirror system, which is beneficial to saving manpower and improving work efficiency, thereby having strong practicability and applicability.

In addition, the embodiment of the present disclosure further provides an apparatus, a device, and a computer readable storage medium corresponding to the method for designing the dual-mirror shared conf partition file, which further makes the method more practical, and the apparatus, the device, and the computer readable storage medium have the same advantages.

BRIEF DESCRIPTION OF THE DRAWINGS

For clearer illustration of the technical solutions according to embodiments of the present disclosure, hereinafter are briefly described the drawings to be applied in embodiments of the present disclosure or the conventional technology. Apparently, the drawings in the following descriptions are only some embodiments of the present disclosure, and other drawings may be obtained by those skilled in the art based on the provided drawings without creative efforts.

DETAILED DESCRIPTION

For those skilled in the art better understanding the solution of the present disclosure, hereinafter the technical solution is further described in detail in conjunction with the drawings and embodiments. Apparently, the described embodiments are only some rather than all of the embodiments of the present disclosure. Any other embodiments obtained based on the embodiments of the present disclosure by those skilled in the art without any creative effort fall within the scope of protection of the present disclosure.

The terms "first", "second", "third", "fourth" and the like in the specification, claims and the above drawings of the present application are used to distinguish different objects, and are not intended to describe a specific order. Moreover, the terms "including", "having" and any variants thereof are intended to cover a non-exclusive inclusion. For example, a process, method, system, product, or device that includes a series of steps or units is not limited to the steps or units listed, but may include a step or unit not listed.

Having briefly described the technical solutions of the embodiments of the present disclosure, various non-restrictive embodiments of the present disclosure are described in detail below.

Figure 1:
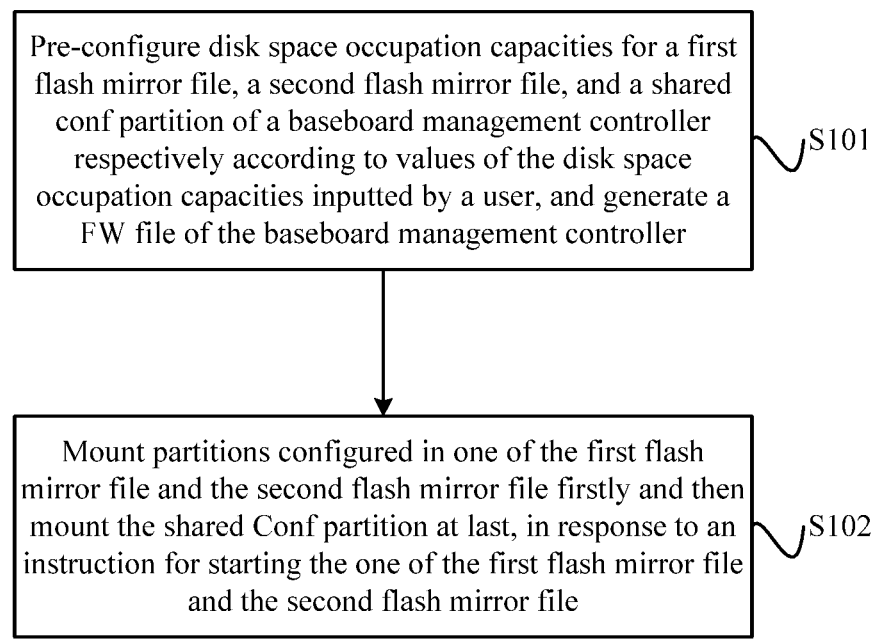
FIG. 1 is a schematic flowchart of a method for designing a dual-mirror shared conf partition file according to an embodiment of the present disclosure.

FIG. 1 is a schematic flowchart of a method for designing a dual-mirror shared conf partition file according to an embodiment of the present disclosure, which is applied to a dual-mirror system of a baseboard management controller. Referring to FIG. 1, in the embodiment of the present disclosure, the method may include the following steps S101 to S102.

In step S101, disk space occupation capacities are pre-configured for a first flash mirror file, a second flash mirror file, and a shared conf partition file of the baseboard management controller respectively according to values of the disk space occupation capacities inputted by a user, and a FW file of the baseboard management controller is generated.

In step S102, partitions of one of the first flash mirror file and the second flash mirror file are mounted first, and then the shared conf partition is mounted at last, in response to an instruction for starting the one of the first flash mirror file and the second flash mirror file.

Firstly, sizes of files of the dual-mirror system of the BMC and a size of the shared conf partition are configured. The user may input the sizes according to actual needs, and the system receives the command inputted by the user, and configures disk space capacities occupied by the first flash mirror file, the second flash mirror file, and the shared conf partition of the BMC.

The flash memory of the BMC has a dual-mirror system, namely the first flash mirror file (or a first mirror system) and the second flash mirror file (or a second mirror system).

By default, the file in the shared conf partition is not in the FW file.

When the BMC runs for a first time, the BMC automatically configures the shared conf partition, generates a configuration file for itself, and stores the configuration file in the shared conf partition. The configuration file mainly includes information related to user settings, such as a login name and a password.

The shared conf partition is located in the flash memory of the baseboard management controller. In an implementation, the shared conf partition may be located at the backend of the flash memory of the baseboard management controller.

After the BMC automatically generates the shared conf partition and the configuration file, the BMC updates information of other partitions (than the shared conf partition) into the flash.

When a mirror system is started according to a user instruction, regardless of which one of the first flash mirror file and the second flash mirror file is started, partitions of the flash mirror files are firstly mounted. For example, a root partition, a boot partition, a www partition and an osimage partition are firstly mounted, and then the shared conf partition located at the backend of the flash is mounted at last.

In the technical solution provided by the embodiment of the present disclosure, based on the shared conf partition of the BMC dual-mirror system, the two mirror systems use the conf partition of the shared area. Regardless of which mirror system is used, the shared conf partition located in the flash memory is mounted at last. The configuration information of the BMC is stored in the shared conf partition to avoid duplicate configuration. In this way, the two mirror systems can use the same configuration information, so as to ensure that files of the conf partition that are started by the two mirror systems are consistent without requiring a further configuration. Therefore, a more reasonable and effective dual-mirror shared conf partition file is designed for the BMC dual-mirror system, which is beneficial to saving manpower and improving work efficiency, thereby having strong practicability and applicability.

Figure 2:
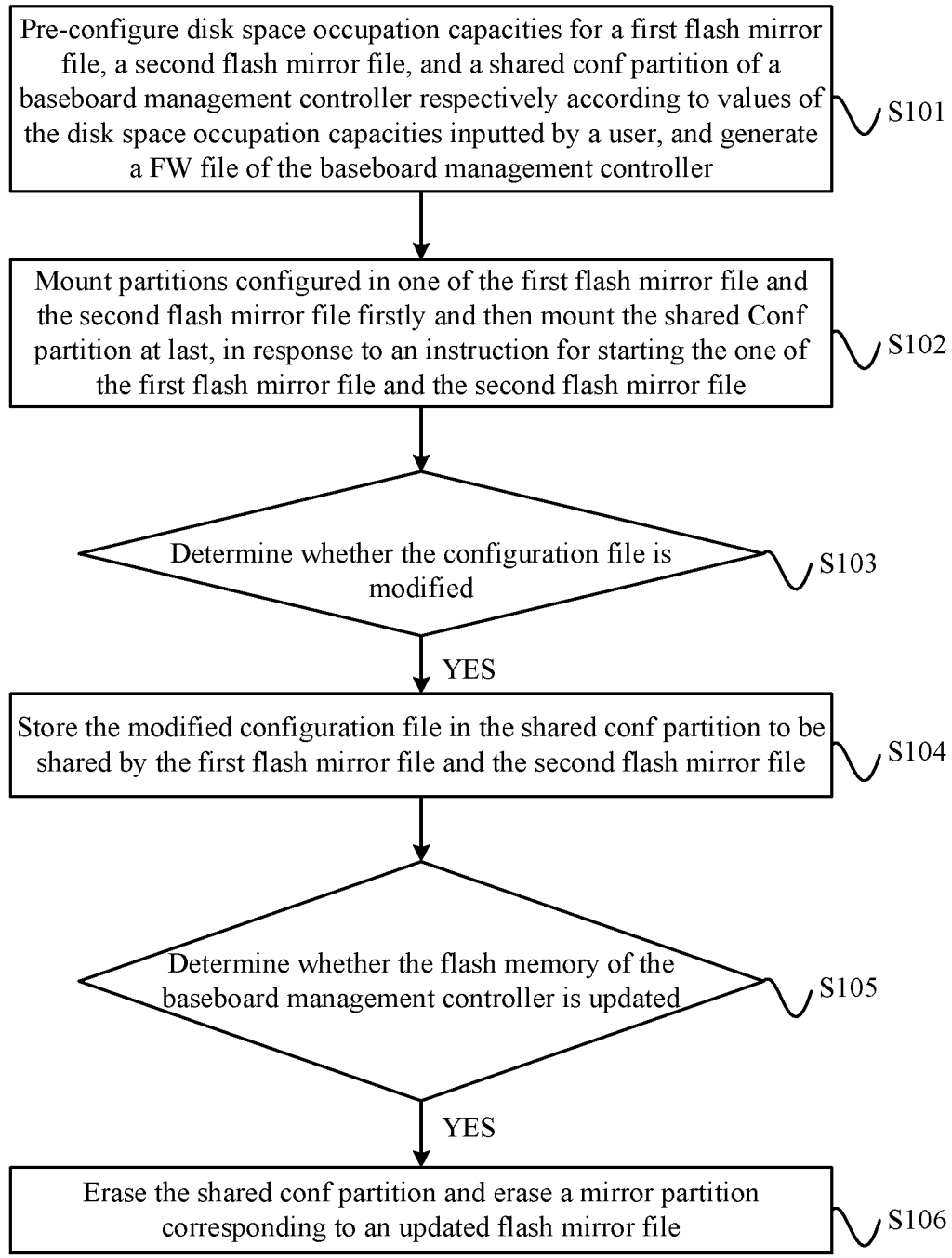
FIG. 2 is a schematic flowchart of another method for designing a dual-mirror shared conf partition file according to an embodiment of the present disclosure.

Considering that the user may modify the configuration file later, or update the mirror system, the forgoing embodiment of the present disclosure may further include the following steps S103 to S106, referring to FIG. 2.

In step S103, it is determined whether the configuration file is modified. If the configuration file is modified, the process proceeds to S104.

In step S104, the modified configuration file is stored into the shared conf partition, to be shared by the first flash mirror file and the second flash mirror file.

In step S105, it is determined whether the flash memory of the baseboard management controller is updated. If the flash memory of the baseboard management controller is updated, the process proceeds to S106.

In step S106, the shared conf partition is erased, and a mirror partition corresponding to updated one of the first flash mirror file and the second flash mirror file is erased.

When the flash of BMC is updated, regardless of which mirror is updated, the shared conf partition and the corresponding mirror partition of the Flash are erased. For example, when updating the first mirror system, the shared conf partition and the first flash mirror file will be erased.

After the user modifies the configuration information stored in the shared conf partition, the modified configuration information is stored in the shared conf partition, so that both of the first flash mirror file and the second flash mirror file can share the modified configuration information to avoid duplicate configuration, which effectively solves the problem of many unnecessary troubles caused by inconsistent configuration files after one of the first mirror system and the second mirror system are updated when a configuration is saved, thereby saving manpower and time.

According to an embodiment of the present disclosure, an apparatus corresponding to the method for designing the dual-mirror shared conf partition file is provided, to further make the method more practical. The apparatus for designing the dual-mirror shared conf partition file according to the embodiment of the present disclosure is described below. The apparatus for designing the dual-mirror shared conf partition file described below and the method for designing the dual-mirror shared conf partition file described above can be referred to each other.

Figure 3:
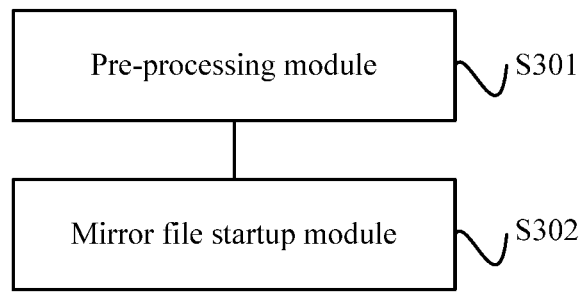
FIG. 3 is a structural diagram of an apparatus for designing a dual-mirror shared conf partition file according to an embodiment of the present disclosure.

FIG. 3 is a structural diagram of an apparatus for designing a dual-mirror shared conf partition file according to an embodiment of the present disclosure. Referring to FIG. 3, the apparatus include a pre-processing module 301 and a mirror file startup module 302.

The pre-processing module 301 is configured to pre-configure disk space occupation capacities for a first flash mirror file, a second flash mirror file, and a shared conf partition file of a baseboard management controller respectively according to values of the disk space occupation capacities inputted by a user, and generate a FW file of the baseboard management controller. The shared conf partition file is not in the FW file. The shared conf partition is automatically generated when the baseboard management controller runs normally for a first time. The shared conf partition stores a configuration file of the baseboard management controller. The configuration file is automatically generated when the baseboard management controller runs normally for the first time. The shared conf partition is located in a flash memory of the baseboard management controller.

The mirror file startup module 302 is configured to mount partitions of one of the first flash mirror file and the second flash mirror file firstly and then mount the shared conf partition at last, in response to an instruction for starting the one of the first flash mirror file and the second flash mirror file.

Figure 4:
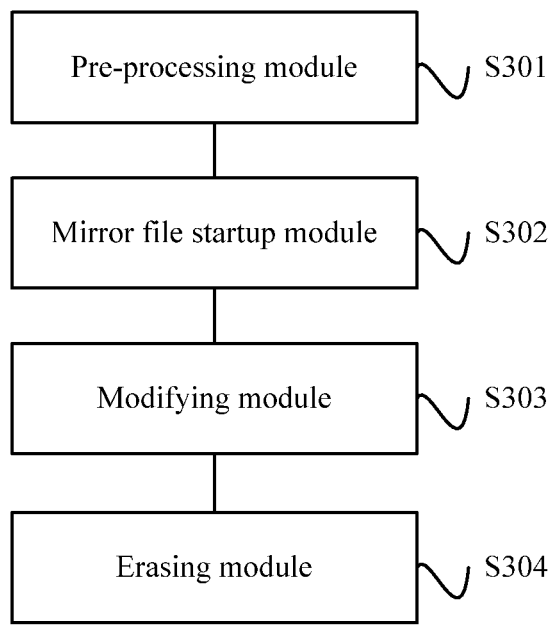
FIG. 4 is a structural diagram of another apparatus for designing a dual-mirror shared conf partition file according to an embodiment of the present disclosure.

Optionally, in some implementations of the present embodiment, referring to FIG. 4, the apparatus may include a modifying module 303.

The modifying module 303 is configured to store, when it is detected that the configuration file is modified, the modified configuration file into the shared conf partition, so as to be shared by the first flash mirror file and the second flash mirror file.

In addition, in other implementations of the present embodiment, the apparatus may further include an erasing module 304.

The erasing module 304 is configured to erase the shared conf partition and erase a mirror partition corresponding to updated one of the first flash mirror file and the second flash mirror file, in a case that an update of the flash of the baseboard management controller is detected.

The function of each functional module of the apparatus for designing a dual-mirror shared conf partition file according to the embodiment of the present disclosure may be implemented according to the method in the foregoing method embodiment. For the implementation process, one may refer to the related description of the foregoing method embodiment, and details are not described herein again.

As can be seen from the above, in the embodiment of the present disclosure, with the BMC dual-mirror system shared conf partition, two mirror systems use the conf partition of the shared area. Regardless of which mirror system is used, the shared conf partition located in the flash is mounted at last. The configuration information of the BMC is stored in the shared conf partition to avoid duplicate configuration. In this way, the two mirror systems can use the same configuration information, so as to ensure that files of the conf partition that are started by the two mirror systems are consistent without requiring a further configuration. Therefore, a more reasonable and effective dual-mirror shared conf partition file is designed for the BMC dual-mirror system, which is beneficial to saving manpower and improve work efficiency, thereby having strong practicability and applicability.

A device for designing a dual-mirror shared conf partition file is further provided in an embodiment of the present disclosure. The device may include a memory and a processor.

The memory is configured to store a computer program.

The processor is configured to execute the computer program to implement steps of the method for designing a dual-mirror shared conf partition file as described in any of the embodiments above.

The function of each functional module of the device for designing a dual-mirror shared conf partition file according to the embodiment of the present disclosure may be implemented according to the method in the foregoing method embodiment. For the implementation process, one may refer to the related description of the foregoing method embodiment, and details are not described herein again.

It can be seen from the above that, with the embodiment of the present disclosure, a more reasonable and effective dual-mirror shared conf partition file is designed for the BMC dual-mirror system, which is beneficial to saving manpower and improving work efficiency, thereby having strong practicability and applicability.

A computer readable storage medium is further provided in an embodiment of the present disclosure, which stores a program for designing a dual-mirror shared conf partition file. The program for designing the dual-mirror shared conf partition file is used to be executed by a processor to implement steps of the method for designing a dual-mirror shared conf partition file as described in any of the embodiments above.

The functions of the functional modules of the computer readable storage medium according to the embodiments of the present disclosure may be implemented according to the method in the foregoing method embodiments. For the implementation process, one may refer to the related description of the foregoing method embodiments, and details are not described herein again.

It can be seen from the above that, with the embodiment of the present disclosure, a more reasonable, scientific and effective dual-mirror shared conf partition file is designed for the BMC dual-mirror system, which is beneficial to saving manpower and improving work efficiency, thereby having strong practicability and applicability.

The embodiments in the specification are described in a progressive way, and each embodiment lays emphasis on differences from other embodiments. For the same or similar parts between various embodiments, one may refer to the description of other embodiments. For the apparatus disclosed in the embodiment, since it corresponds to the method disclosed in the embodiment, the description is relatively simple, and for the relevant parts, one may refer to the description of the method.

A person skilled in the art will further appreciate that units and steps of various examples described in connection with the embodiments disclosed herein can be implemented in electronic hardware, computer software or a combination thereof. In order to clearly illustrate interchangeability between the hardware and software, the composition and steps of various examples have been generally described in terms of function in the above description. Whether these functions are performed in hardware or software depends on the specific application and design constraints of the solution. A person skilled in the art can use different methods for implementing the described functions for different particular application, but such implementation should not be considered to be beyond the scope of the present disclosure.

The steps of the method or algorithm described in connection with the embodiments disclosed herein can be implemented directly in hardware, a software module executed by a processor, or a combination thereof. The software module can be disposed in an random access memory (RAM), a memory, a read only memory (ROM), an electrically programmable ROM, electrically erasable programmable ROM, a register, a hard disk, a removable disk, a CD-ROM, or any other form of storage medium known in the technical field.

The method, apparatus, device and computer readable storage medium for designing a dual-mirror shared conf partition file according to the present disclosure are described in detail above. The principles and embodiments of the present disclosure have been described herein with reference to specific examples, and the description of the above embodiments is only to assist in understanding the method of the present disclosure and its core idea. It should be noted that those skilled in the art can make various modifications and changes to the present disclosure without departing from the spirit and scope of the invention.

The invention claimed is:

1. A method for designing a dual-mirror shared conf partition file, which is applied to a dual-minor system of a baseboard management controller, comprising:
pre-configuring disk space occupation capacities for multiple private partitions of a first flash minor file and a second flash mirror file, and a shared conf partition of the baseboard management controller respectively according to values of the disk space occupation capacities inputted by a user, and generating a FW file of the baseboard management controller, wherein the first flash minor file and the second flash minor file are backup to each other and are to be used to start the baseboard management controller, the configuration for the multiple private partitions are included in the FW file, the configuration for the shared conf partition is not in the FW file; and mounting the multiple private partitions of one of the first flash minor file and the second flash minor file firstly according to the FW file, and then mounting the shared Conf partition at last, in response to an instruction for starting the baseboard management controller by the one of the first flash minor file and the second flash minor file, wherein the shared conf partition is automatically generated at the time that the baseboard management controller runs normally for the first time, the shared conf partition stores a configuration file of the baseboard management controller, the configuration file is automatically generated at the time that the baseboard management controller runs normally for the first time, and the shared conf partition is located in a flash memory of the baseboard management controller.

2. The method for designing a dual-minor shared conf partition file according to claim 1, further comprising:
 detecting that the configuration file is modified; and
 storing the modified configuration file in the shared conf partition, to be shared by the first flash mirror file and the second flash mirror file.

3. The method for designing a dual-minor shared conf partition file according to claim 1, further comprising:
 detecting that the flash memory of the baseboard management controller is updated; and
 erasing the shared conf partition and erasing a mirror partition corresponding to updated one of the first flash minor file and the second flash mirror file.

4. The method for designing a dual minor shared conf partition file according to claim 1, wherein the shared conf partition is located at a backend of the flash memory of the baseboard management controller.

5. The method for designing a dual-minor shared conf partition file according to claim 1, wherein the multiple private partitions-comprises:
 a root partition, a boot partition, a www partition, and an osimage partition.

6. A device for designing a dual-minor shared conf partition file, comprising:
 a memory storing a computer program; and
 a processor configured to execute the computer program stored in the memory to perform operations of:
 pre-configuring disk space occupation capacities for multiple private partitions of a first flash minor file and a second flash minor file, and a shared conf partition of the baseboard management controller respectively according to values of the disk space occupation capacities inputted by a user, and generating a FW file of the baseboard management controller, wherein the first flash mirror file and the second flash mirror file are backup to each other and are to be used to start the baseboard management controller, the configuration for the multiple private partitions are included in the FW file, the configuration for the shared conf partition is not in the FW file; and
 mounting the multiple private partitions of one of the first flash mirror file and the second flash mirror file firstly according to the FW file, and then mounting the shared Conf partition at last, in response to an instruction for starting the baseboard management controller by the one of the first flash minor file and the second flash mirror file, wherein the shared conf partition is automatically generated at the time that the baseboard management controller runs normally for the first time, the shared conf partition stores a configuration file of the baseboard management controller, the configuration file is automatically generated at the time that the baseboard management controller runs normally for the first time, and the shared conf partition is located in a flash memory of the baseboard management controller.

7. The device for designing a dual-minor shared conf partition file according to claim 6, wherein the processor is configured to execute the computer program stored in the memory to further perform an operation of:
 detecting that the configuration file is modified; and
 storing the modified configuration file in the shared conf partition, to be shared by the first flash minor file and the second flash mirror file.

8. The device for designing a dual-minor shared conf partition file according to claim 6, wherein the processor is configured to execute the computer program stored in the memory to further perform an operation of:
 detecting that the flash memory of the baseboard management controller is updated; and
 erasing the shared conf partition and erasing a mirror partition corresponding to updated one of the first flash minor file and the second flash mirror file.

9. The device for designing a dual minor shared conf partition file according to claim 6, wherein the shared conf partition is located at a backend of the flash memory of the baseboard management controller.

10. The device for designing a dual-minor shared conf partition file according to claim 6, wherein wherein the multiple private partitions comprises:
 a root partition, a boot partition, a www partition, and an osimage partition.

11. A computer readable storage medium, wherein the computer readable storage medium stores a program for designing a dual-mirror shared conf partition file, and the program for designing the dual-mirror shared conf partition file is used to be executed by a processor to perform operations of:
 pre-configuring disk space occupation capacities for multiple private partitions of a first flash mirror file and a second flash mirror file, and a shared conf partition of the baseboard management controller respectively according to values of the disk space occupation capacities inputted by a user, and generating a FW file of the baseboard management controller, wherein the first flash mirror file and the second flash mirror file are backup to each other and are to be used to start the baseboard management controller, the configuration for the multiple private partitions are included in the FW file, the configuration for the shared conf partition is not in the FW file; and
 mounting the multiple private partitions of one of the first flash mirror file and the second flash minor file firstly according to the FW file, and then mounting the shared Conf partition at last, in response to an instruction for starting the baseboard management controller by the one of the first flash minor file and the second flash minor file, wherein the shared conf partition is automatically generated at the time that the baseboard management controller runs normally for the first time, the shared conf partition stores a configuration file of the baseboard management controller, the configuration file is automatically generated at the time that the baseboard management controller runs normally for the first time, and the shared conf partition is located in a flash memory of the baseboard management controller.

12. The computer readable storage medium according to claim 11, wherein the program for designing the dual-mirror shared conf partition file is used to be executed by the processor to further perform an operation of:
   detecting that the configuration file is modified; and
   storing the modified configuration file in the shared conf partition, to be shared by the first flash mirror file and the second flash mirror file.

13. The computer readable storage medium according to claim 11, wherein the program for designing the dual-mirror shared conf partition file is used to be executed by the processor to further perform an operation of:
   detecting that the flash memory of the baseboard management controller is updated; and
   erasing the shared conf partition and erasing a mirror partition corresponding to updated one of the first flash minor file and the second flash mirror file.

14. The computer readable storage medium according to claim 11, wherein the shared conf partition is located at a backend of the flash memory of the baseboard management controller.

15. The computer readable storage medium according to claim 11, wherein the multiple private partitions comprises:
   a root partition, a boot partition, a www partition, and an osimage partition.

\* \* \* \* \*